US012794011B2

(12) United States Patent
Hwang et al.

(10) Patent No.: US 12,794,011 B2
(45) Date of Patent: Nov. 10, 2026

(54) ADDITIVE CONTAINING SULFIDE-BASED SOLID ELECTROLYTE

(71) Applicant: National Taiwan University of Science and Technology, Taipei (TW)

(72) Inventors: Bing-Joe Hwang, Taipei (TW); Sheng-Chiang Yang, Taipei (TW); She-Huang Wu, Taipei (TW); Wei-Nien Su, Taipei (TW); Yosef Nikodimos Asgedom, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 753 days.

(21) Appl. No.: 17/890,357

(22) Filed: Aug. 18, 2022

(65) Prior Publication Data

US 2023/0343995 A1 Oct. 26, 2023

(30) Foreign Application Priority Data

Apr. 22, 2022 (TW) ................................. 111115363

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0065* (2013.01)

(58) Field of Classification Search
None
See application file for complete search history.

(56) References Cited

U.S. PATENT DOCUMENTS 4,501,686 A * 2/1985 Hotta ...................... H01M 4/60 524/415
2010/0290969 A1* 11/2010 Deiseroth ......... H01M 10/0562 423/303

(Continued)

FOREIGN PATENT DOCUMENTS

DE 102019206133 A1 * 10/2020 ........ H01M 10/0525
JP 2013062242 A * 4/2013
WO WO-2021225831 A1 * 11/2021 .......... H01M 50/446

OTHER PUBLICATIONS

National Center for Biotechnology Information (2026). PubChem Compound Summary for CID 16702007, Aluminum acetylacetonate. Retrieved Jan. 14, 2026 from https://pubchem.ncbi.nlm.nih.gov/compound/Aluminum-acetylacetonate. (Year: 2007).*

*Primary Examiner* — Maria V Ewald
*Assistant Examiner* — Suhani Jitendra Patel
(74) *Attorney, Agent, or Firm* — Best & Flanagan LLP

(57) ABSTRACT

The present invention provides an additive containing sulfide-based solid electrolyte having an acidic component attached to the sulfide-based solid electrolyte. The sulfide-based solid electrolyte comprises a —PS structure having at least a phosphorous atom and a sulfur atom. The acidic component carries a positive charge which could firmly attach to the sulfur atom of the —PS structure of the sulfide-based solid electrolyte. The present invention utilizes the acidic component as the additive to enhance the water or vapor resistance ability to the sulfide-based solid electrolyte. By using compatible acidic component, the additive could firmly attach to the sulfur atom of the —PS structure of the sulfide-based solid electrolyte but still maintaining in good electrical properties. By enhancing the sulfur atom of the —PS structure of the sulfide-based solid electrolyte, the present invention could benefit the mass production for such material.

4 Claims, 5 Drawing Sheets

(56) References Cited

U.S. PATENT DOCUMENTS

| | | | | |
|---|---|---|---|---|
| 2019/0027788 | A1* | 1/2019 | Liu | H01M 4/625 |
| 2020/0052330 | A1* | 2/2020 | Choi | H01M 10/0565 |
| 2021/0242501 | A1* | 8/2021 | Sakamoto | H01M 10/0569 |
| 2022/0093922 | A1* | 3/2022 | Kim | H01M 10/0525 |

* cited by examiner

ADDITIVE CONTAINING SULFIDE-BASED SOLID ELECTROLYTE

FIELD OF INVENTION

Present invention is related to an additive containing electrolyte, especially to an additive containing sulfide-based solid electrolyte which is able to reduce water or moisture vapor sensitivity and maintain a performance of a sulfide-based solid electrolyte.

The present invention has been developed primarily to be an electrolyte, especially to sulfide-based solid electrolyte for describing hereinafter with references and multiple embodiments to this application. However, it will be appreciated that the present invention is not limited to this particular method, field of use or effect.

BACKGROUND OF THE INVENTION

The sulfide-based solid electrolyte has its conductivity closed to the organic liquid electrolyte with more advantages of efficiency and safety concerns for making this material becoming important for next generation of development in solid-state lithium ion battery.

However, on the opposite side of the high-efficiency performance, the sulfur atom (—S) from the phosphorus-sulfur ($PS_4^{3-}$) functional group of the sulfide-based solid electrolyte is extremely easy to react with hydrogen ions (—$H^+$) of water molecule from the moisture of the environment and generates hydrogen sulfide gas. As such, the sulfide-based solid electrolyte will have decreased ability or even lost its function. Therefore, the current production of sulfide-based solid electrolyte needs to be carried out in a high demand environment filled with high-purity argon or in an ultra-low humidity environment to avoid contact with moisture from the air, which will undoubtedly increase the manufacturing cost and delay the commercialization of solid-state lithium ion battery. Hence, it is eager to have a solution that will overcome or substantially ameliorate at least one or more of the deficiencies of a prior art, or to at least provide an alternative solution to the problems. It is to be understood that, if any prior art formation is referred to herein, such reference does not constitute an admission that the information forms part of the common general knowledge in the art.

SUMMARY OF THE INVENTION

In order to solve the problem that existing sulfide solid state electrolysis is easy to react with moisture causing decreased ability or even lost its function, the present invention provides an additive containing sulfide-based solid electrolyte comprising: a sulfide-based solid electrolyte and an acidic component attached thereon; wherein: the sulfide-based solid electrolyte comprises a phosphorus sulfur structure with at least one phosphorus atom and one sulfur atom; the sulfide-based solid electrolyte comprises a phosphorus sulfur structure with at least one phosphorus atom and one sulfur atom; the positive charge attaches to the phosphorus sulfur structure of the sulfide-based solid electrolyte.

In accordance, the phosphorus sulfur structure includes —PS, —$PS_4^{3-}$, —$P_2S_6^{4-}$ or —$P_2S_7^{4-}$.

In accordance, the acidic component dissociates and generates an acidic radical, ion or group with positive charge and a base radical, ion or group with negative charge; and the acidic radical, ion or group with positive charge attaches to the sulfur atom of the phosphorus sulfur structure of the sulfide-based solid electrolyte.

In accordance, the acidic radical, ion or group with positive charge attaches to the sulfur atom of the phosphorus sulfur structure of the sulfide-based solid electrolyte.

In accordance, one of the preferred embodiment of the sulfide-based solid electrolyte comprises $Li_6PS_5Cl$.

In accordance, the acidic component includes aluminum pentanedionate (Al(acaca)3), triphenylcarbenium tetrafluoroborate (TPCTFB), trityl hexafluorophosphate (TTHFP), tetracyanoethylene (TCE), tetrafluoro-tetracyano quino-dimethane (TCNQ) or p-Fluoranil.

In accordance, the hydrophobic structure comprises a carbon chain or a benzene ring.

In accordance, the present invention has the following advantages:

1. The present invention provides an additive containing sulfide-based solid electrolyte. The additive can be effectively attached on the sulfide-based solid electrolyte, and reduces the moisture sensitivity of the sulfide-based solid electrolyte and maintains its electrical properties which have more benefits for introducing such material into mass production.

2. The production method of the additive containing sulfide-based solid electrolyte of the present invention is extremely easy and simple. The additive only needs to be contacted with the sulfide-based solid electrolyte and it will be adsorbed and attached on the sulfide-based solid electrolyte by a simple acid-base reaction process. As the acidic and alkali properties of the additive from the acidic component and the sulfide-based solid electrolyte are close, the additive can be firmly attached on the sulfide solid-state electrolyte to improve a moisture sensitivity for the sulfide-based solid electrolyte.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by, the present invention to p achieve the above and other objects can be best understood by referring to the p following detailed description of the preferred embodiments and the accompanying p drawings.

DETAILED DESCRIPTION OF THE PREFERRED EMBODIMENTS

Figure 1:
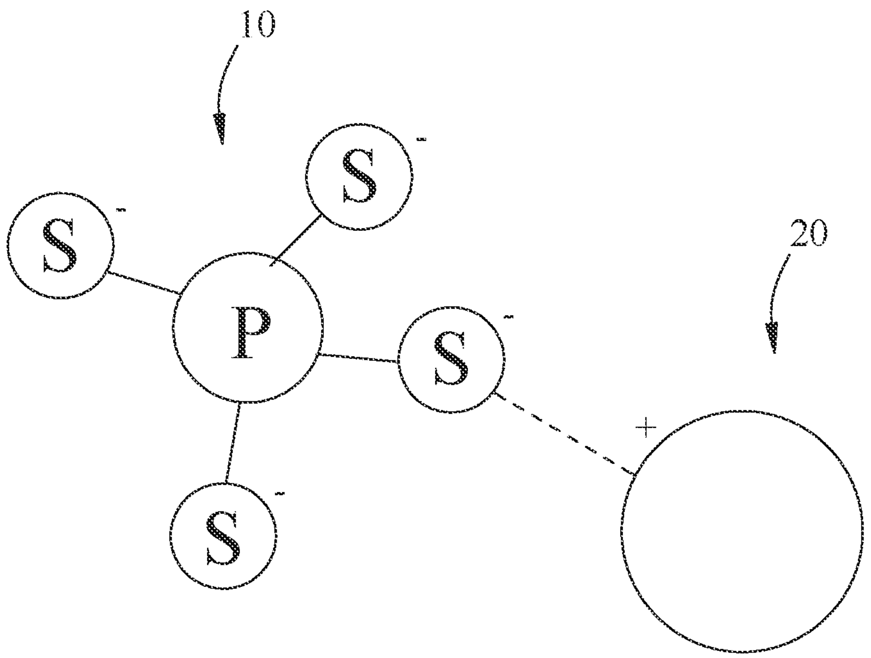
FIG. 1 is an illustrated figure of attaching the acidic component on the phosphorus sulfur structure in accordance to the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these 4 specific details. As used in the description herein and throughout the claims that follow, the meaning of “a”, “an”, and “the” may include reference to the plural unless the context clearly dictates otherwise. Also, as used in the description herein and throughout the claims that follow, the terms “comprise or comprising”, “include or including”, “have or having”, “contain or containing” and the like are to be understood to be open-ended, i.e., to mean including but not limited to.

<Additive Containing Sulfide-Based Solid Electrolyte>

With reference to FIG. 1, the present invention provides an additive containing sulfide-based solid electrolyte comprising a sulfide-based solid electrolyte and an acidic component 20 attached thereon. The said sulfide-based solid electrolyte comprises a phosphorus sulfur structure 10 (—PS) including but not limited to —PS, $—PS_4^{3-}$ (as shown in FIG. 1), $—P_2S_6^{4-}$ or $—P_2S_7^{4-}$. One preferred embodiment of the sulfide-based solid electrolyte could be $Li_6PS_5Cl$. The phosphorus sulfur structure 10 of the sulfide-based solid electrolyte is preferably to have a function of conducting lithium ions.

After the acidic component 20 being contacted with the sulfide-based solid electrolyte, at least two different reactions may occur to make the acidic component 20 being attached on the phosphorus sulfur structure 10. The first preferred reaction is that the acidic component 20 normally carries with positive charge which will react with the sulfur atom ($S^-$) of the phosphorus sulfur structure 10 carried with opposite negative charge to form a stable structure. Another preferred reaction is that the acidic component 20 will dissociate generating an acidic radical, ion or group with positive charge and a base radical, ion or group with negative charge. The acidic radical, ion or group with positive charge will attract and attach on the sulfide-based solid electrolyte or more preferable on the phosphorus sulfur structure 10.

Figure 2A:
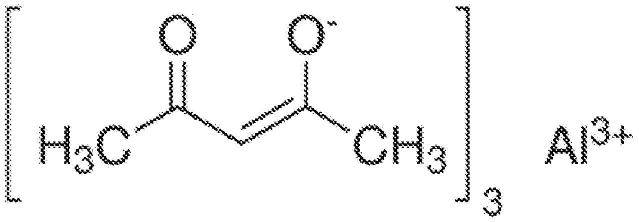
FIG. 2A to FIG. 2F are illustrate figures of several preferred embodiments of the acidic component in accordance to the present invention.
Figure 2B:
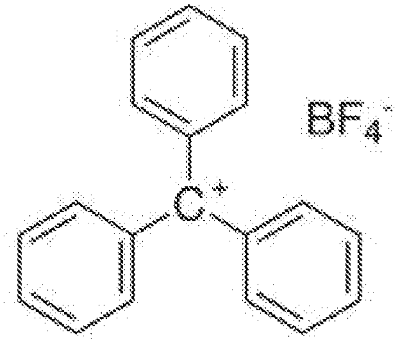
Figure 2C:
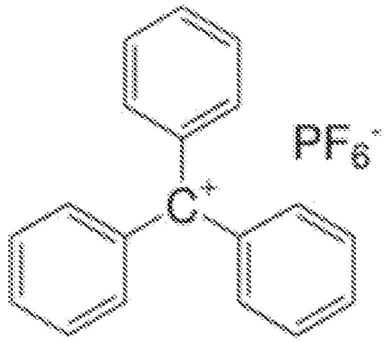
Figure 2D:
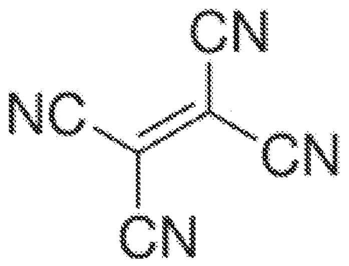
Figure 2E:
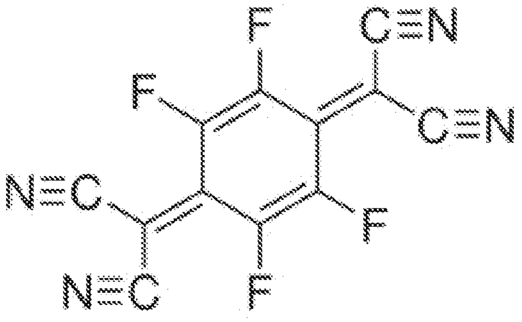
Figure 2F:
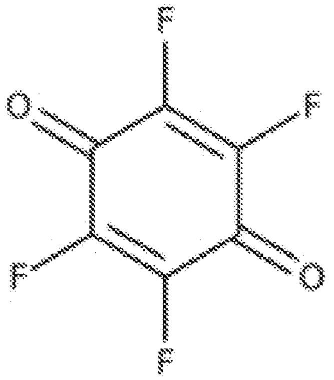

With reference to FIG. 2A to FIG. 2F, the acidic component 20 includes aluminum pentanedionate (Al(acaca)3) as shown in FIG. 2A, triphenylcarbenium tetrafluoroborate (TPCTFB) in FIG. 2B, trityl hexafluorophosphate (TTHFP) as shown in FIG. 2C, tetracyanoethylene (TCE) in FIG. 2D, tetrafluoro-tetracyano quino-dimethane (TCNQ) in FIG. 2E or p-Fluoranil in FIG. 2F.

Further, the acidic component 20 of the present invention is preferred to have a hydrophobic property presenting with a hydrophobic structure. For example, such hydrophobic structure could be carbon chains consisted from the aforementioned $Al(acaca)_3$ in FIG. 2A and TCE of FIG. 2D. Benzene ring structure came from TTHFP, TCNQ in FIG. 2C, FIG. 2E and p-Fluoranil in FIG. 2F. Such hydrophobic structure is able to further improve the stability of the phosphorus sulfur structure 10 and also provide an effect of suppressing a formation of hydrogen sulfide in a humid or moisture environment.

Originally, the phosphorus atoms contained in the phosphorus-sulfur structure 10 of the present invention is considered a strong acidic property and the peripheral sulfur atoms are considered as a weak alkali property with reference to current or basic chemical concepts. Such imbalanced strong acidic and weak alkali structure makes the phosphorus sulfur structure 10 easily to react with hydrogen atoms came from air or moisture environment with degrading structure and decreasing abilities. In order to have the acidic component 20 and the phosphorus-sulfur structure 10 to form a stable structure, the acidic component 20 of the present invention is preferred to have a weak acidic property, more preferably it has a equivalent acidity with the weak alkali property of the sulfur atoms of the phosphorus sulfur structure 10 of the sulfide solid electrolyte. When the acidic component 20 is attached onto the phosphorus sulfur structure 10, the comparable acidity and alkali property could make such complex or combination forming with a stable structure. The phosphorus sulfur structure 10 will hence become not easy to react with hydrogen atoms from air or the moisture, and increases the water vapor resistance property. The aforementioned current or basic chemical concepts for defining the strong acidic property and the weak alkali property are preferred to be Hard-Soft Acid-Base Theory (HSAB) which the scale of strong or weakness for such acidic or alkali property may be based on an eletronegativity, atomic size, resonance effect, inductive effect or degree of dissociation in aqueous solution.

<Production Method of Additive Containing Sulfide-Based Solid Electrolyte>

The present invention preferably takes any suitable or currently available sulfide-based solid electrolyte on market with the phosphorus sulfur structure 10 and mixes it with a solution of the acidic component 20, so that the acidic component 20 can be attached on the sulfide phosphorus sulfur structure 10 of the sulfide-based solid electrolyte.

<Validity Tests of Additive-Containing Sulfide Solid-State Electrolyte>

With reference to below table 1 and FIG. 3, various validation tests of the preferred embodiment of the present invention compared with a comparative example are presented. The comparative example is a pure sulfide-based solid electrolyte without any modification that does not attached with any additives. The embodiments 1 to 4 are the sulfide-based solid electrolyte that attached with different additives respectively in accordance with the present invention.

Figure 3:
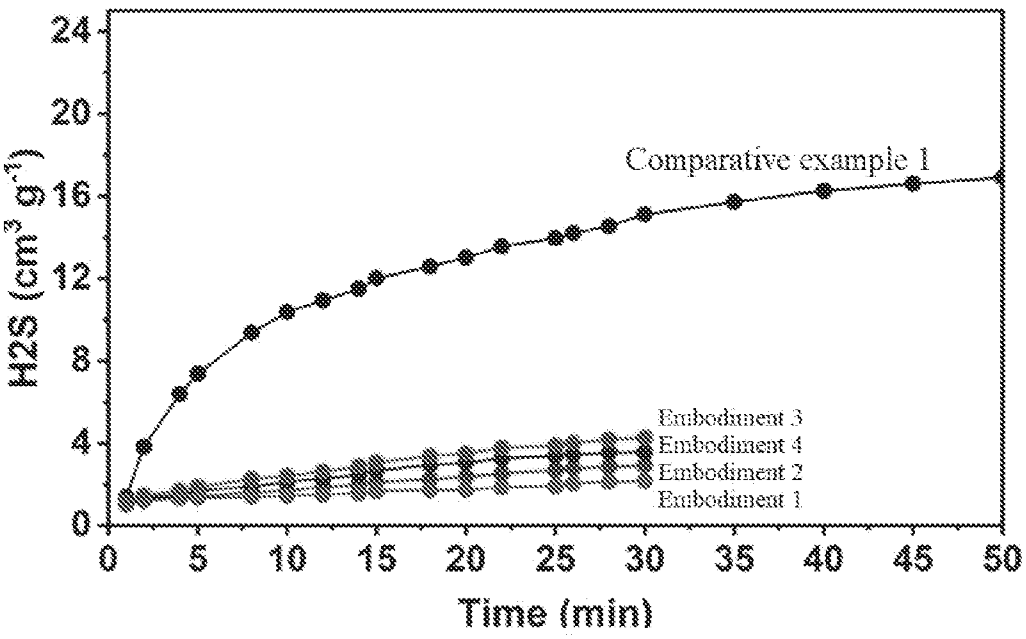
FIG. 3 is a moisture-sensitive analysis of several embodiments and comparative example in accordance to the present invention.

With reference to FIG. 3, a moisture sensitive analysis of the multiple embodiments of the present invention and the comparative example is presented. In this analysis, a hydrogen sulfide gas is detected with its concentration after contacting the additive containing sulfide-based solid electrolytes of the present invention and the comparative example. The result as shown in FIG. 3, the sulfide gas is increased with contacting time for the comparative example. The embodiments of the present invention otherwise produce very little sulfide gas and even stop producing after 30 minutes. This is direct evidence showing that the moisture from the air will not react with the phosphorus sulfur structure 10 of the sulfide-based solid electrolyte for maintaining its function without degradation.

TABLE 1

It is understandable that although Table 1 only lists $Li_6PS_5Cl$ as a preferred embodiment of the sulfide solid-state electrolyte, other possible or suitable sulfide solid-state electrolytes that contain the phosphorus-sulfur structure 10 such as —PS, $—PS_4^{3-}$, $—P_2S_6^{4-}$ or $—P_2S_7^{4-}$ should also within the scope of the present invention and have been proven valid.

| Embodiment/ example | Components | |
|---|---|---|
| Comparative | Sulfide solid-state electrolyte | $Li_6PS_5Cl$ |

TABLE 1-continued

It is understandable that although Table 1 only lists $Li_6PS_5Cl$ as a preferred embodiment of the sulfide solid-state electrolyte, other possible or suitable sulfide solid-state electrolytes that contain the phosphorus-sulfur structure 10 such as —PS, —$PS_4^{3-}$, —$P_2S_6^{4-}$ or —$P_2S_7^{4-}$ should also within the scope of the present invention and have been proven valid.

| Embodiment/ example | Components | |
|---|---|---|
| example 1 | Additive | None (Pure sulfide solid-state electrolyte) |
| Embodiment 1 | Sulfide solid-state electrolyte | $Li_6PS_5Cl$ |
| | Additive | TPCTFB |
| Embodiment 2 | Sulfide solid-state electrolyte | $Li_6PS_5Cl$ |
| | Additive | Al(acac)3 |
| Embodiment 3 | Sulfide solid-state electrolyte | $Li_6PS_5Cl$ |
| | Additive | TCNQ |
| Embodiment 4 | Sulfide solid-state electrolyte | $Li_6PS_5Cl$ |
| | Additive | TCE |

Figure 4:
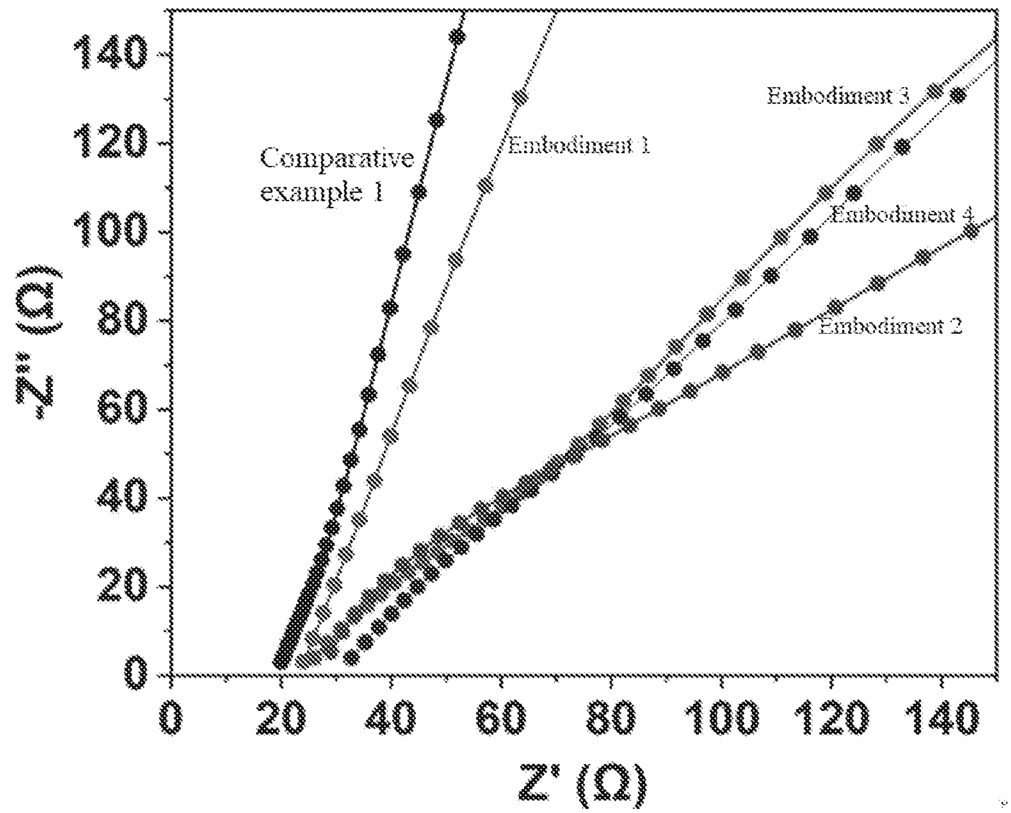
FIG. 4 is an electrical impedance analysis of several embodiments and comparative example in accordance to the present invention.

With reference to below Table 2 and FIG. 4, an electrical impedance analysis of the above-mentioned embodiments of the present invention is presented. As shown in the result, the electrical impedance generated by each embodiments of the present invention is lower than the comparative example of the sulfide-based solid electrolyte without additives.

TABLE 2

| Embodiment/example | $\sigma \times 10^{-3}$ S $cm^{-1}$ |
|---|---|
| Comparative example 1 | 2.546 |
| Embodiment 1 | 2.11 |
| Embodiment 2 | 1.959 |
| Embodiment 3 | 1.755 |
| Embodiment 4 | 1.553 |

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could rake numerous alterations or modifications to the disclosed embodiments without departing from the spirit or scope of this disclosure.

What is claimed is:

1. An additive containing sulfide-based solid electrolyte comprising a sulfide-based solid electrolyte and an acidic component attached thereon; wherein:

the sulfide-based solid electrolyte comprises a phosphorus sulfur structure with at least one phosphorus atom and one sulfur atom;

the acidic component carries with a positive charge; the acidic component includes aluminum pentanedionate (Al(acaca)3), triphenylcarbenium tetrafluoroborate (TPCTFB) or trityl hexafluorophosphate (TTHFP) and;

the acidic component comprises a hydrophobic property presenting with a hydrophobic structure suppressing a formation of hydrogen sulfide for the sulfide-based solid electrolyte; the hydrophobic structure comprises a carbon chain or a benzene ring; and the positive charge attaches to the phosphorus sulfur structure of the sulfide-based solid electrolyte.

2. The electrolyte as claimed in claim 1, wherein: the phosphorus sulfur structure includes —PS, —$PS_4^{3-}$, —$P_2S_6^{4-}$ or —$P_2S_7^{4-}$.

3. The electrolyte as claimed in claim 1, wherein: the acidic component dissociates and generates an acidic radical, ion or group with the positive charge and a base radical, ion or group with the negative charge; and the acidic radical, ion or group with positive charge attaches to the sulfur atom of the phosphorus sulfur structure of the sulfide-based solid electrolyte.

4. The electrolyte as claimed in claim 1, wherein: the sulfide-based solid electrolyte comprises $Li_6PS_5Cl$.

* * * * *